(12) United States Patent
Sasaki et al.

(10) Patent No.: US 9,457,741 B2
(45) Date of Patent: Oct. 4, 2016

(54) WIRE HARNESS

(71) Applicant: Yazaki Corporation, Tokyo (JP)

(72) Inventors: Noriaki Sasaki, Makinohara (JP); Toshiaki Yamashita, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/740,418

(22) Filed: Jun. 16, 2015

(65) Prior Publication Data
US 2015/0360627 A1    Dec. 17, 2015

(30) Foreign Application Priority Data

Jun. 17, 2014  (JP) ................................. 2014-124373
Jun. 17, 2014  (JP) ................................. 2014-124374

(51) Int. Cl.
*B60R 16/02* (2006.01)
*H01R 9/03* (2006.01)
*H01R 11/20* (2006.01)

(52) U.S. Cl.
CPC ........... *B60R 16/0207* (2013.01); *H01R 9/031* (2013.01); *H01R 11/20* (2013.01)

(58) Field of Classification Search
CPC .......... B60R 16/0207; B60R 16/0215; B60R 16/023; B60R 16/0238; B60R 16/0239
USPC ............................................. 174/72 R, 72 A
See application file for complete search history.

(56) References Cited

U.S. PATENT DOCUMENTS

| 4,831,278 | A * | 5/1989 | Ueda ................... | B60R 16/0207 174/71 R |
| 5,971,799 | A * | 10/1999 | Swade ................ | B60R 16/0207 439/502 |
| 6,249,060 | B1 * | 6/2001 | Osha ........................ | B60L 3/12 307/10.1 |
| 2002/0180271 | A1* | 12/2002 | Taniguchi ........... | B60R 16/0207 307/10.1 |
| 2003/0070830 | A1* | 4/2003 | Kondo ................ | B60R 16/0207 174/68.1 |
| 2004/0158413 | A1* | 8/2004 | Matsuda ............. | B60R 16/0207 702/33 |

FOREIGN PATENT DOCUMENTS

JP          2004268630 A      9/2004

* cited by examiner

*Primary Examiner* — Hoa C Nguyen
*Assistant Examiner* — Amol Patel
(74) *Attorney, Agent, or Firm* — Sughrue Mion, PLLC

(57) ABSTRACT

A wire harness includes a main harness that can be commonly installed in a plurality of installation target vehicles, and a branch connection portion that is visually identifiably provided at a predetermined location on at least any one of a communication wire, a power supply wire, a signal wire, and a ground wire of the main harness. An additional connection member, connected to at least one electrical device that is actually installed in one of the plurality of installation target vehicles, is later connectable to the branch connection portion in a branching manner.

9 Claims, 18 Drawing Sheets

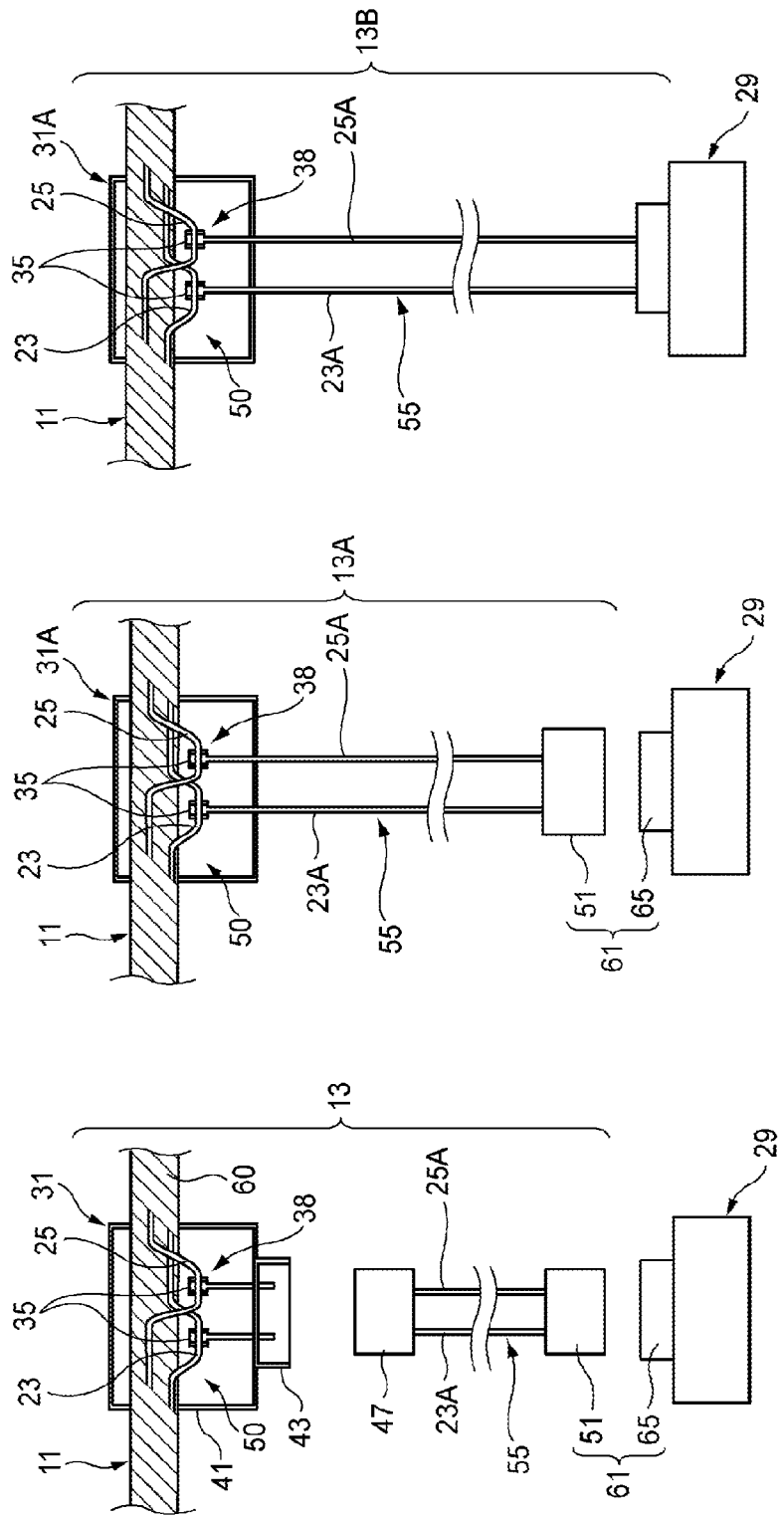

FIG.14
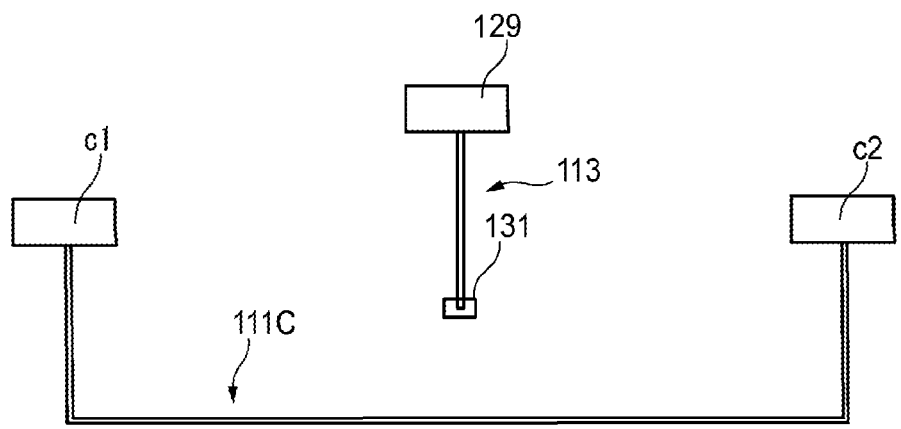
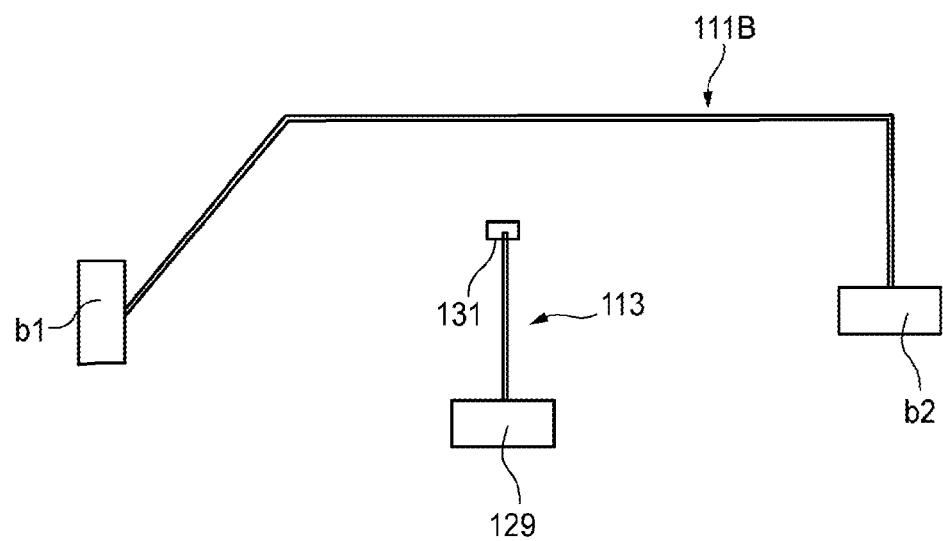

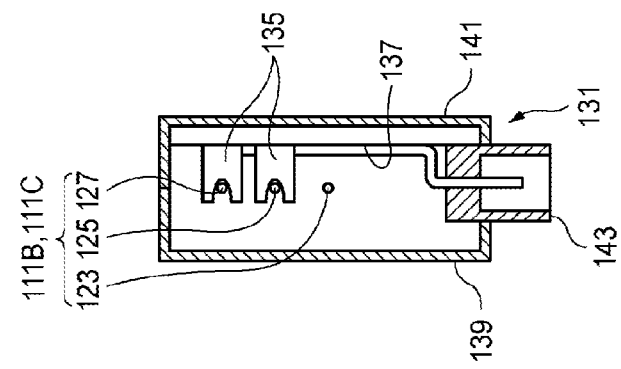
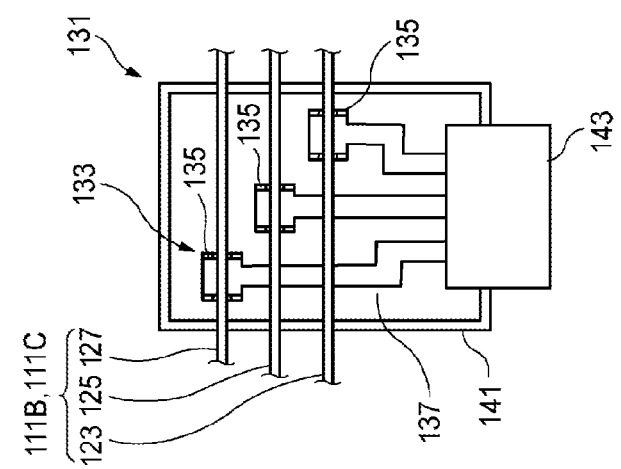
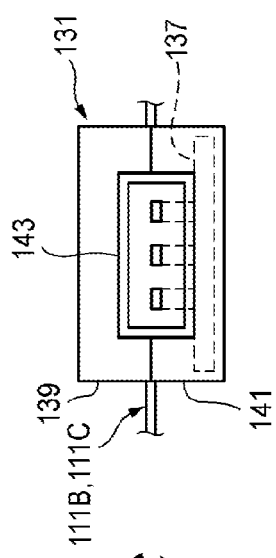
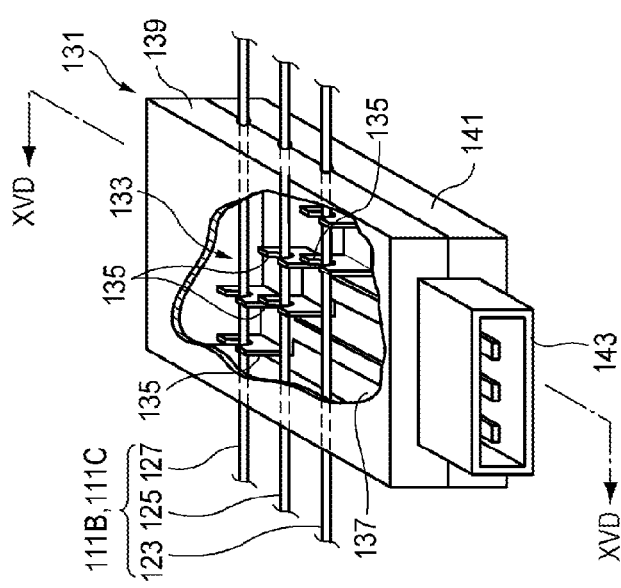

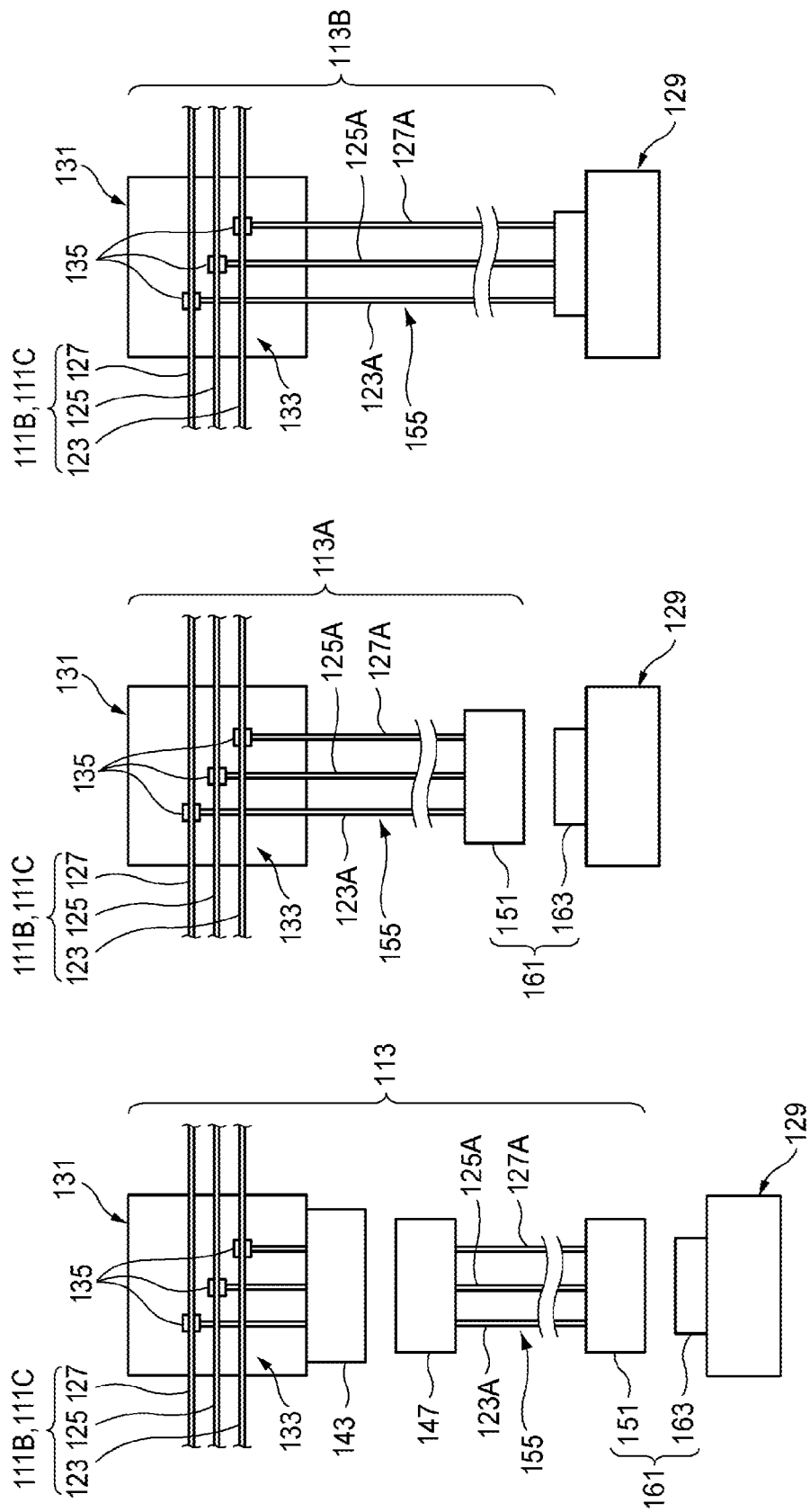

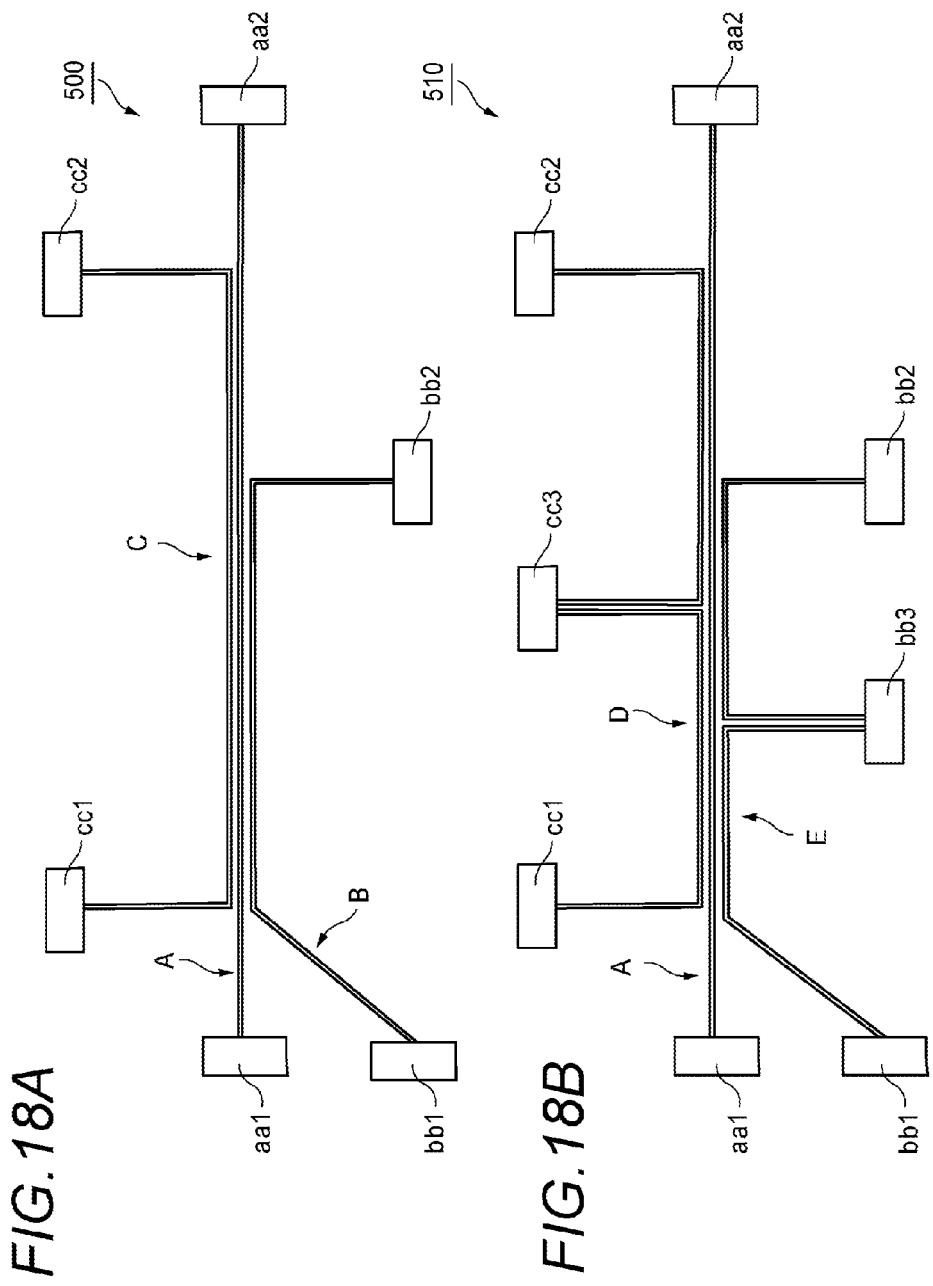

WIRE HARNESS

CROSS REFERENCE TO RELATED APPLICATION(S)

This application is based upon and claims the benefit of priorities of Japanese Patent Applications No. 2014-124373 and No. 2014-124374, both filed on Jun. 17, 2014, the contents of which are incorporated herein by reference in its entirety.

BACKGROUND OF THE INVENTION

1. Field of the Invention

The present invention relates to a wire harness.

2. Description of the Related Art

A number of various electrical devices, for example, lamps, motors, and switch units for operating these lamps and motors, are mounted in a vehicle. Each of these various electrical devices is connected to a wire harness through which electric power from a battery or the like and a control signal for controlling the electrical device are supplied to the electrical device. The wire harness is made of a plurality of electric wires, connectors, and the like. The electric wire includes a core wire and an insulating coating portion that coats the core wire. The connector includes metal terminals and a connector housing, in which the metal terminal is installed at the end of the electric wire and is connected to the electric wire, and the connector housing is made of insulating resin and accommodates the metal terminal.

In recent years, a vehicle network system (for example, refer to JP-A-2004-268630) is used as a communication system that controls a plurality of vehicle electrical devices mounted in a vehicle. In the vehicle network system, a plurality of electronic control units configured to control the respective vehicle electrical devices are connected to each other via a multiplex communication wire, exchange multiplex signals with each other, and control the operation of the vehicle electrical devices based on the multiplex signals.

Typically, the entire wire harness routed in the vehicle is made by assembling together sub harnesses that are respectively sub-categorized for a plurality of system circuits. For example, there are the following system circuits: a standard circuit for an indispensible electrical device such as a head lamp or a wiper, and an option circuit for an electrical device such as a security system or a rear fog lamp which is selected depending on the type or grade of the vehicle. When such a vehicle wire harness is manufactured, it is determined whether the entire wire harness is appropriate while taking the disposition or terminals of connectors, the types of electric wires, and the like into consideration.

For example, as illustrated in FIG. 18A, a wire harness 500 in the related art is made up of three sub harnesses A, B, and C. Root ends (left ends in FIG. 18A) of the sub harnesses A, B, and C have connectors aa1, bb1, and cc1 connected to control units (not illustrated), respectively, and branch ends (right ends in FIG. 18A) thereof have device-side connectors aa2, bb2, and cc2 connected to destined connectors of controlled devices (electrical devices), which are targets controlled by the control units, respectively.

When optional controlled devices are additionally connected to the wire harness 500, as illustrated in FIG. 18B, a manufacturer prepares a wire harness 510 having sub harnesses D and E, branched wires of which have device-side connectors cc3 and bb3 connected to destined connectors of the optional controlled devices, respectively.

Patent Literature 1: JP-A-2004-268630

SUMMARY OF THE INVENTION

However, as in the wire harnesses 500 and 510 illustrated in FIGS. 18A and 18B, when the sub harnesses D and E having the device-side connectors cc3 and bb3 are added for the additionally connected optional controlled devices, part numbers of wire harnesses increase. The increase of part numbers of wire harnesses to be assembled causes complexity in the assembling of the wire harness in an assembly line, and a decrease in efficiency in the assembling of the wire harness. For this reason, there is a problem in that mass productivity of the wire harness decreases, and the cost of the constituent components and the wire harness increase.

In contrast, when the wire harness 510 illustrated in FIG. 18B is used as efforts to decrease part numbers of wire harnesses regardless of whether or not optional controlled devices are configured, the use of the wire harness 510 causes the occurrence of the device-side connectors cc3 and bb3 and electric wires as constituent components which are routed but are not actually used (so-called "disused constituent components"), and an increase in a waste of wire harnesses, thereby increasing the cost of the wire harness.

A non-limited object of the present invention is to provide a wire harness, a part number of which can be commonly used, and a waste of which can be prevented, and a wire harness manufacturing method.

The above non-limited object of the present invention may be achieved with the following configuration.

(1) A wire harness including: a main harness that can be commonly installed in a plurality of installation target vehicles; and a branch connection portion that is visually identifiably provided at a predetermined location on at least any one of a communication wire, a power supply wire, a signal wire, and a ground wire of the main harness, wherein an additional connection member, connected to at least one electrical device that is actually installed in one of the plurality of installation target vehicles, is later connectable to the branch connection portion in a branching manner.

In the wire harness with the configuration (1), it is possible to commonly use the main harness that can be commonly installed in the plurality of installation target vehicles, and it is possible to later connect the electrical device, to be actually installed in one of the installation target vehicles, to the main harness via the additional connection member, which is connected in a branching manner to at least any one of the communication wire, the power supply wire, the signal wire, and the ground wire of the main harness. Accordingly, there are no waste or disused constituent components occurring in the main harness.

Since it is possible to connect the additional connection member to the main harness in a branching manner, depending on the number of electrical devices to be installed on the installation target vehicle, there are no waste or disused constituent components occurring in the entire wire harness.

In a wire harness in the related art, an increase in the number of optional electrical devices causes the increase of the entire part numbers of wire harnesses along with the number of installation combinations of the optional electrical devices. In contrast, in the wire harness with the configuration (1), it may be sufficient if a part number of only the additional connection member is ensured corresponding to the number of optional electrical devices. Accordingly, it is easy to manage manufacturing components, and it is possible to reduce a wire harness manufacturing cost.

In addition, the branch connection portion connected to the additional connection member in a branching manner is visually identifiably provided at the predetermined location on the main harness. For example, the branch connection portion is provided, such that, as in an extra-length portion, the shape of an electric wire is formed different from those of other portions, or the color or shape of an electric wire is formed different from those of other portions. Accordingly, a worker can easily identify the branch connection portion connected to the end of the additional connection member, and predetermined wires, when connecting the additional connection member to the main harness in a branching manner in an inspection/finishing step after a wiring step in a manufacturing process for the wire harness, or when connecting the end of the additional connection member to the main harness in a branching manner so that the optional electrical device can be later connected to a vehicle-mounted wire harness. For this reason, it is possible to prevent the end of the additional connection member from being erroneously later connected to an electric wire which is not predetermined electric wires of the main harness, and it is possible to prevent the occurrence of a case in which the additional connection member cannot be appropriately connected to the electrical device because the branch connection location is too far apart from the electrical device.

(2) The wire harness according to the configuration (1), wherein at least two of the communication wire, the power supply wire, the signal wire, and the ground wire are held in the branch connection portion while being arrayed.

In the wire harness with the configuration (2), when connecting the end of the additional connection member to at least two predetermined electric wires of the communication wire, the power supply wire, the signal wire, and the ground wire in the branch connection portion of the main harness in a branching manner, a worker can connect a press-contact portion of the harness branch connection mechanism to the respective conductors of a plurality of the predetermined electric wires in a press-contact manner at once. As a result, the end of the additional connection member can be easily connected in a branching manner to the plurality of predetermined electric wires, and connection between the main harness and the electrical device is simply completed.

(3) The wire harness according to the configuration (1) or (2), wherein the branch connection portion is configured as an extra-length portion wrapped around an outer circumference of the main harness.

In the wire harness with the configuration (3), when connecting the end of the additional connection member to at least any one of the communication wire, the power supply wire, the signal wire, and the ground wire of the branch connection portion of the main harness in a branching manner, a worker can simply perform a branch connection operation only by unwrapping an extra-length portion of the predetermined electric wire wrapped around an outer circumference of the main harness. That is, it is possible to eliminate labor of pulling the predetermined electric wire of length required to perform the branch connection operation from the bundle of the main harness. The extra-length portion of the branch connection portion is wrapped around the outer circumference of the main harness, and even if the extra-length portion of the branch connection portion is not connected in a branching manner to the end of the additional connection member, the extra-length portion of the branch connection portion does not interfere with other components, and thus is prevented from being damaged.

A part number of a wire harness of the present invention can be commonly used, and a waste or disuse of the wire harness can be prevented.

Some aspects of the present invention has been briefly described up to this point. Details of the present invention become clear if embodiments, to be described hereinbelow, of the present invention are read through with reference to the accompanying drawings.

BRIEF DESCRIPTION OF THE DRAWINGS

In the accompanying drawings:

FIGS. 4A to 4C are plan views of the additional connection member with the harness branch connection mechanism, in which FIG. 4A illustrates the additional connection member in which a main harness-side connector and a device-side connector are respectively connected to an end of an electric wire adjacent to the main harness and an end of the electric wire adjacent to an electrical device, FIG. 4B illustrates the additional connection member in which the end of the electric wire adjacent to the main harness is directly connected to the harness branch connection mechanism, and FIG. 4C illustrates the additional connection member in which the end of the electric wire adjacent to the main harness is directly connected to the harness branch connection mechanism, and the end of the electric wire adjacent to the electrical device is directly connected to the electrical device;

FIG. 14 is a schematic view illustrating a state in which the additional connection member is disassembled from the sub harness illustrated in FIG. 13;

FIG. 15A is a perspective view of a partially fractured harness branch connection mechanism used in the wire harness manufacturing method of the second embodiment;

FIG. 15B is a plan view of the harness branch connection mechanism illustrated in FIG. 15A;

FIG. 15C is a front view of the harness branch connection mechanism illustrated in FIG. 15A;

FIG. 15D is a sectional view of the harness branch connection mechanism illustrated in FIG. 15A taken along line XVD-XVD.

FIGS. 16A to 16C are plan views of the additional connection member, in which FIG. 16A illustrates the additional connection member in which the sub harness-side connector and the device-side connector are respectively connected to an end of an electric wire adjacent to a sub harness and an end of the electric wire adjacent to an electrical device, FIG. 16B illustrates the additional connection member in which the end of the electric wire adjacent to the sub harness is directly connected to the harness branch connection mechanism, and FIG. 16C illustrates the additional connection member in which the end of the electric wire adjacent to the sub harness is directly connected to the harness branch connection mechanism, and the end of the electric wire adjacent to the electrical device is directly connected to the electrical device;

FIG. 18A is a schematic view illustrating an example of a wire harness in the related art; and FIG. 18B is a schematic view illustrating another example of the wire harness in the related art.

DETAILED DESCRIPTION OF THE EXEMPLARY EMBODIMENTS

Hereinafter, a first embodiment of the present invention is described with reference to the accompanying drawings.

Figure 1:
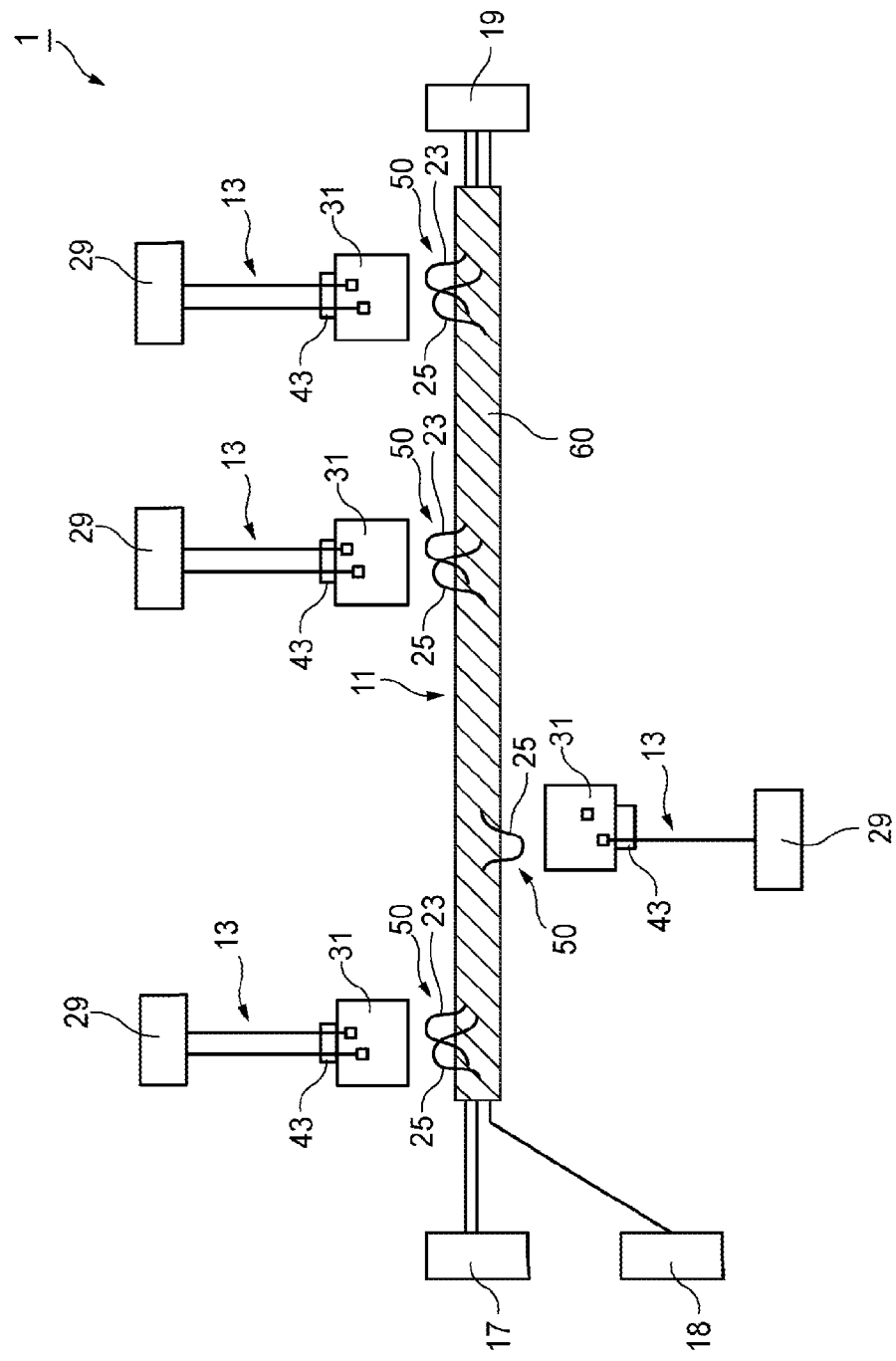
FIG. 1 is a schematic view of a wire harness according to a first embodiment of the present invention.
Figure 2:
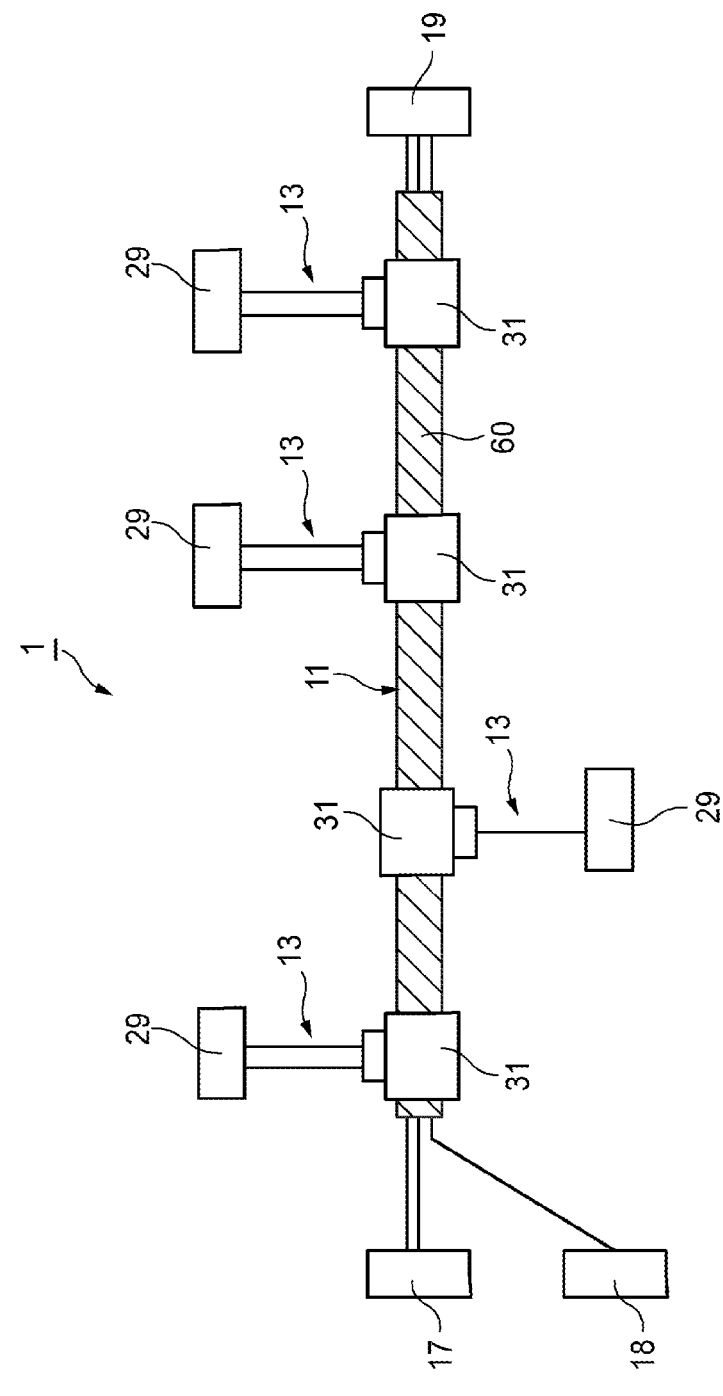
FIG. 2 is a schematic view illustrating a state in which additional connection members are respectively connected in a branching manner to a main harness of the wire harness shown in FIG. 1.

FIG. 1 is a schematic view of a wire harness according to the first embodiment of the present invention.

A wire harness 1 of the first embodiment has a main harness 11 to which a first end of an additional connection member 13 is later connected in a branching manner.

The main harness 11 illustrated in FIG. 1 is a bundle of four types of basic main electric wires including a power supply wire 23, a communication wire 25, a signal wire, a ground (GND) wire 27, and can be commonly installed in a plurality of installation target vehicles. The main harness 11 is connected to a plurality of electric devices (for example, a battery 17 and a joint box 19) and a connector 18. As illustrated in FIG. 1, an insulating tape 60 is wrapped around the outer circumference of the bundled electric wires of the main harness 11, and thus a plurality of the electric wires are bound together. A multiplex signal is transmitted through the communication wire 25 of the main harness 11. A single signal is transmitted through the signal wire of the main harness 11.

In the first embodiment, branch connection portions 50 are visually identifiably provided at predetermined locations (four locations in the first embodiment) on the power supply wire 23 and the communication wire 25 of the main harness 11, respectively, the first end of the additional connection member 13 is later connected in a branching manner to the branch connection portion 50, and a second end of the additional connection member 13 is connected to an electrical device 29 installed in an installation target vehicle.

That is, the branch connection portion 50 of the first embodiment is provided in such a manner that the respective extra-length portions of the power supply wire 23 and the communication wire 25 stick out of a gap in the insulating tape 60 wrapped around the bundled electric wires of the main harness 11. The color or shape of an insulating coating of the power supply wire 23 is formed different from the color or shape of an insulating coating of the communication wire 25.

Accordingly, a worker can easily identify the branch connection portion 50 at a predetermined location on the main harness 11, and the power supply wire 23 and the communication wire 25 (predetermined wires connected to the first end of the additional connection member 13), when connecting the additional connection member 13 to the main harness 11 on a wiring board in a branching manner in an inspection/finishing step after a wiring step in a manufacturing process for the wire harness 1, or when connecting the first end of the additional connection member 13 to the main harness 11 in a branching manner so that the optional electrical device 29 can be later connected to a vehicle-mounted wire harness 1 at a manufacturer's assembly line or dealer.

As illustrated in FIG. 1, the first end of each of a plurality of the additional connection members 13 of the first embodiment is later connected in a branching manner to at least either one of the power supply wire 23 and the communication wire 25 of the main harness 11. In the illustrated example, four additional connection members 13 are connected in a branching manner to the main harness 11. As such, the wire harness 1 of the first embodiment is configured such that the plurality of additional connection members 13 are respectively connected in a branching manner to the branch connection portions 50 positioned at four locations on the main harness 11. As necessary, the additional connection member 13 can connect the electrical device 29 to the main harness 11.

The second end of the additional connection member 13 is connected to at least one electrical device 29 installed in an installation target vehicle. The electrical device 29 is later connected to the main harness 11 via the additional connection member 13 using any late-connection method of "press contact", "bonding", "welding", and the like, which can allow the electrical device 29 to be connected to the main harness 11. In the example of the first embodiment, the additional connection member 13 is connected in a branching manner to the power supply wire 23 and the communication wire 25 of the main harness 11 using a harness branch connection mechanism 31 (to be described later).

Figure 3:
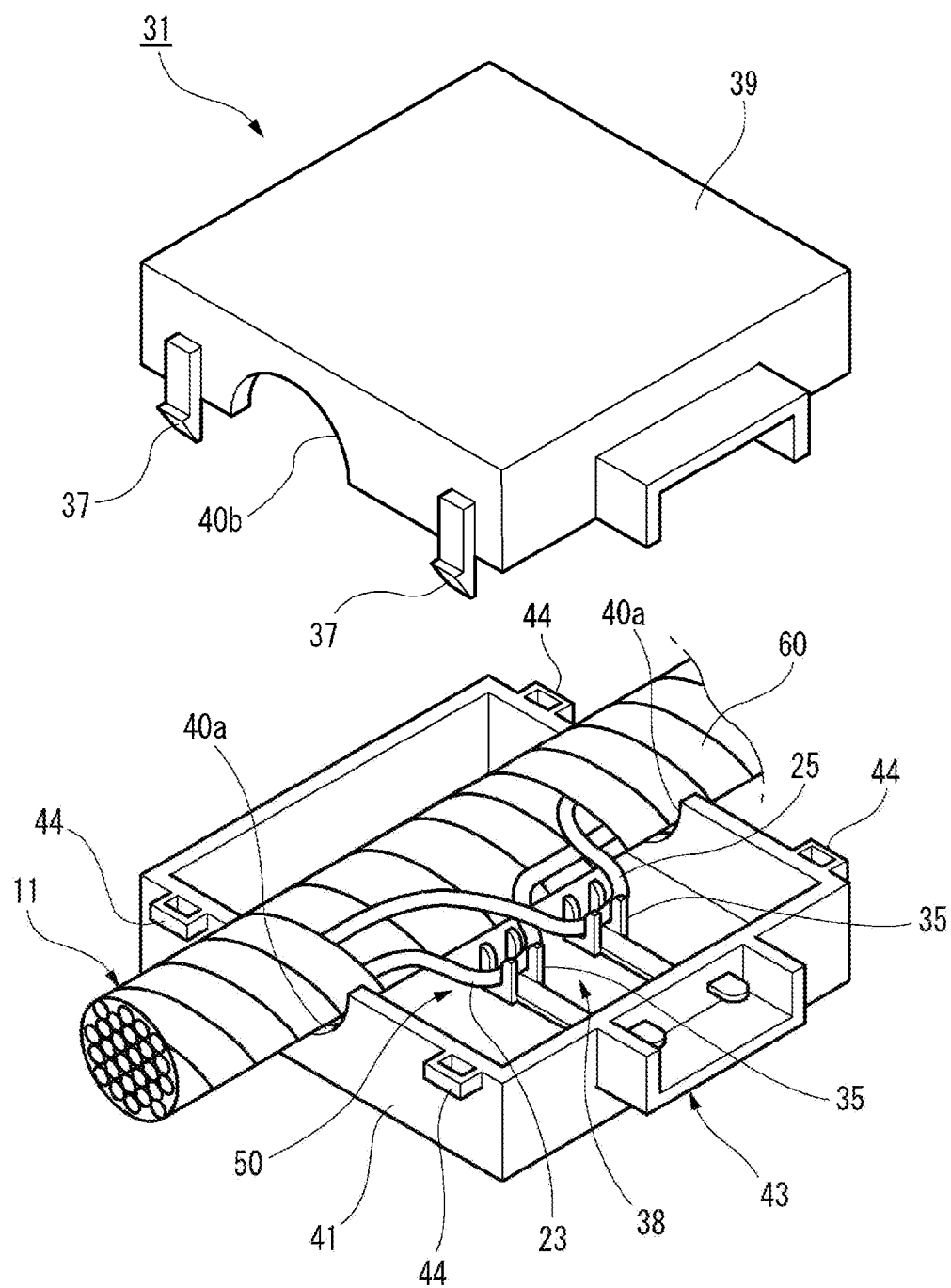
FIG. 3 is a perspective disassembly view of a harness branch connection mechanism used in the wire harness of the first embodiment.

As illustrated in FIG. 3, in the wire harness 1 of the first embodiment, the first end of the additional connection member 13 is connected in a branching manner to the branch connection portion 50 using the harness branch connection mechanism 31, the branch connection portion 50 being provided at the predetermined location on the main harness 11.

The harness branch connection mechanism 31 of the first embodiment has a press-contact portion 38 that is connected in a press-contact manner to a conductor of the main harness 11 by being connected to a conductor of the additional connection member 13. The press-contact portion 38 is configured such that a plurality of press-contact blades 35 in pairs are erected, and the press-contact portion 38 is connected to a predetermined circuit. The branch connection portion 50 of the main harness 11 and the press-contact portion 38 are accommodated in an insulating resin case made up of an upper case 39 and a lower case 41. The upper case 39 and the lower case 41 have the respective insertion grooves 40b and 40a between which the main harness 11 is interposed in an upward and downward direction, and a locking claw 37 of the upper case 39 is locked into a lock portion 44 of the lower case 41 such that the upper case 39 and the lower case 41 are openably and closably connected to each other.

In the harness branch connection mechanism 31, the press-contact blades 35 cut the insulating coatings of the power supply wire 23 and the communication wire 25 in the branch connection portion 50 of the main harness 11, respectively, and the press-contact portion 38 is connected in a press-contact manner to the respective conductors of the power supply wire 23 and the communication wire 25. When the upper case 39 and the lower case 41 are locked into each other with the main harness 11 interposed therebetween, the harness branch connection mechanism 31 is fixed to the branch connection portion 50 of the main harness 11, the harness branch connection mechanism 31 being connected in a press-contact manner to the power supply wire 23 and the communication wire 25 in the branch connection portion 50 of the main harness 11.

That is, in the wire harness of the first embodiment, connection between the main harness 11 and the electrical device 29 is simply completed merely when the harness branch connection mechanism 31 is installed on the branch connection portion 50 of the main harness 11. When a power supply wire 23A of the electrical device 29 is connected in a branching manner to a power supply wire 23 of a harness other than the main harness 11, it is not necessary to connect the power supply wire 23 of the main harness 11 to the electrical device 29 in a branching manner via the additional connection member 13.

The harness branch connection mechanism 31 of the first embodiment can also be provided with a control functional unit having a signal generation unit that is configured to receive a signal via the communication wire 25 and to generate a control signal for controlling the operation of the electrical device 29. The control functional unit is an electronic control unit (ECU) that is configured to electronically control the electrical device 29. The control functional unit is provided in the additional connection member 13 so as to control the operation of the electrical device 29. More specifically, the control functional unit is configured such that a "microcomputer", a "semiconductor fuse", and a "communication transceiver" are mounted on a circuit board or electronic component.

The first end of the additional connection member 13 of the first embodiment is provided with the harness branch connection mechanism 31 through which the additional connection member 13 is connected in a branching manner to the power supply wire 23 and the communication wire 25 in the branch connection portion 50 of the main harness 11, and the second end of the additional connection member 13 is provided with a device connection mechanism 61 through which the additional connection member 13 is connected to the electrical device 29 to be later connected to the installation target vehicle. More specifically, as illustrated in FIG. 4A, the additional connection member 13 has an electric wire 55; a main harness-side connector 47 connected to the harness branch connection mechanism 31 at an end of the electric wire 55 adjacent to the main harness; and a device-side connector 51 connected to the electrical device 29 at an end of the electric wire 55 adjacent to the electrical device. The additional connection member 13 is connected to the device connection mechanism 61 made up of the device-side connector 51 along with a connector 65 of the electrical device 29, and the main harness-side connector 47 is connected to a board mounting connector 43 of the harness branch connection mechanism 31.

That is, the additional connection member 13 of the first embodiment can connect the electrical device 29 to the main harness 11 via the electric wire 55 of desired length, and thus can be mounted in alignment with the position of the electrical device 29, and provide high versatility.

The form of an additional connection member of the present invention is not limited to that of the additional connection member 13 of the first embodiment, and various forms of an additional connection member can be adopted.

For example, an additional connection member 13A illustrated in FIG. 4B is configured such that the end of the electric wire 55 adjacent to the main harness is directly connected to the press-contact portion 38 of a harness branch connection mechanism 31A, and the device-side connector 51 is connected to the connector 65 of the electrical device 29.

An additional connection member 13B illustrated in FIG. 4C is configured such that the end of the electric wire 55 adjacent to the main harness is directly connected to the press-contact portion 38 of the harness branch connection mechanism 31A, and the end of the electric wire 55 adjacent to the electrical device is directly connected to a circuit of the electrical device 29, and is configured integrally with the electrical device 29. Naturally, the additional connection member 13B can also be configured such that the main harness-side connector 47, provided at the end of the electric wire 55 adjacent to the main harness, is connected to the board mounting connector 43 of the harness branch connection mechanism 31 (refer to FIG. 4A).

The function of the electric wire 55 of the additional connection members 13, 13A, and 13B changes depending on the type (whether the electrical device 29 includes an electronic control unit, or the like) of the electrical device 29. For example, as illustrated in FIGS. 4A to 4C, when a body grounded electrical device 29 including an electronic control unit (not illustrated) is provided in the vicinity of the end of the electric wire 55 adjacent to the electrical device, the electric wire 55 is made up of a power supply wire 23A and a communication wire 25A.

Subsequently, in a wire harness according to modification examples of the first embodiment, various visually identifiably provided branch connection portions 50A to 50G are described.

Figure 5A:
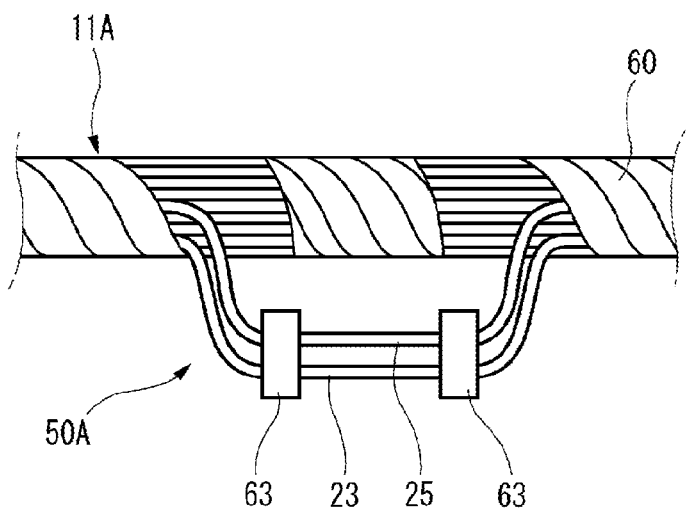
FIG. 5A is a plan view of a branch connection portion in the wire harness of a modification example of the first embodiment.

In the branch connection portion 50A illustrated in FIG. 5A, two power supply wire 23 and communication wire 25 are held while being arrayed using an array member 63 such as a tape or mold.

That is, the branch connection portion 50A of the modification example is provided in such a manner that the respective extra-length portions of the power supply wire 23 and the communication wire 25 stick out of a gap in the insulating tape 60 wrapped around bundled electric wires of a main harness 11A, and are held while being arrayed in parallel with each other using a pair of the array members 63, and thus the branch connection portion 50A can be visually identified at predetermined locations on the main harness 11A.

The branch connection portion 50A may be fixed with a tape or the like along an outer circumference of the main harness 11A.

Figure 5B:
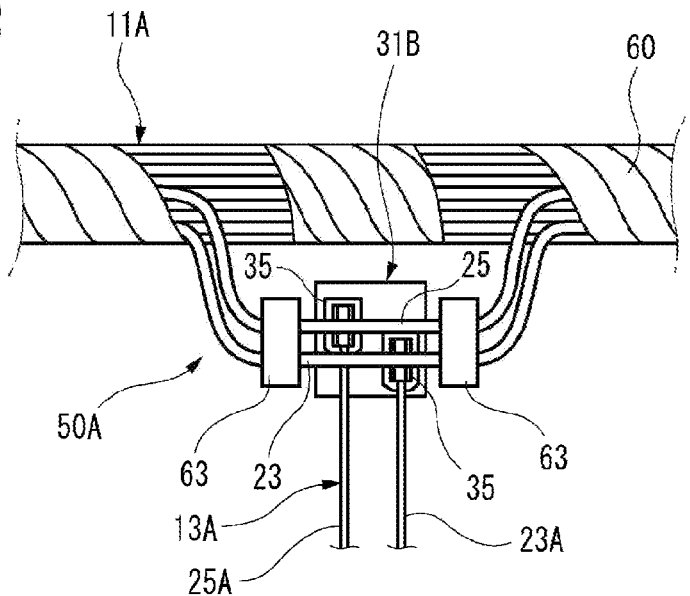
FIG. 5B is a plan view illustrating a state in which an additional connection member is connected to the branch connection portion.

Accordingly, as illustrated in FIG. 5B, when connecting the first end of the additional connection member 13A to the power supply wire 23 and the communication wire 25 of the branch connection portion 50A in a branching manner, a worker can connect a pair of the press-contact blades 35 of a harness branch connection mechanism 31B to the respective conductors of both the power supply wire 23 and the communication wire 25 in a press-contact manner at once.

That is, in the harness branch connection mechanism 31B, when the power supply wire 23 and the communication wire 25 are interposed between the upper and lower cases while arrayed in parallel with each other, the press-contact blades 35 dissect the insulating coatings of the power supply wire 23 and the communication wire 25, and can be connected in a press-contact manner to the conductors of the power supply wire 23 and the communication wire 25, respectively, and thereby a press-contact operation can be easily performed. The first end of the additional connection member 13A can be easily connected in a branching manner to a plurality of the power supply wire 23 and the communication wire 25, and connection between the main harness 11A and the electrical device 29 is simply completed.

Figure 6A:
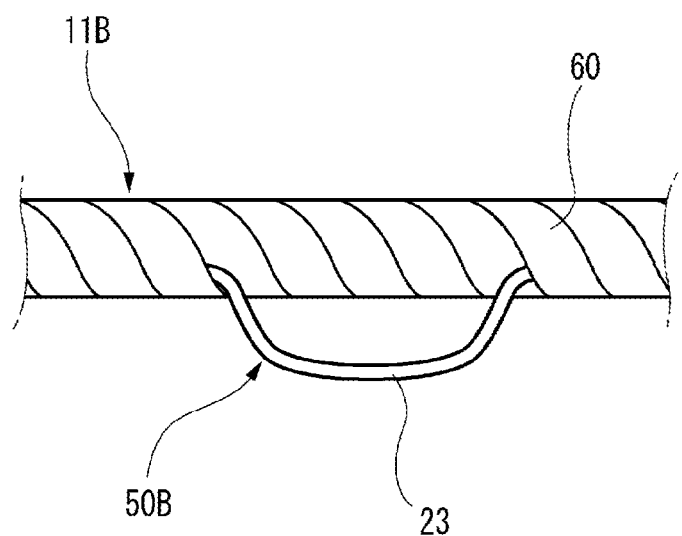
FIG. 6A is a plan view of a branch connection portion in the wire harness of a modification example of the first embodiment.

The branch connection portion 50B illustrated in FIG. 6A is provided in such a manner that the extra-length portion of the power supply wire 23 sticks out of a gap in the insulating tape 60 wrapped around which bundled electric wires of a main harness 11B.

That is, the branch connection portion 50B of the modification example is provided in such a manner that the extra-length portion of the power supply wire 23 sticks out of a gap in the insulating tape 60 wrapped around the bundled electric wires of the main harness 11B, and thus can be visually identified at predetermined locations on the main harness 11B.

The branch connection portion 50B may be fixed with a tape or the like along an outer circumference of the main harness 11B.

Figure 6B:
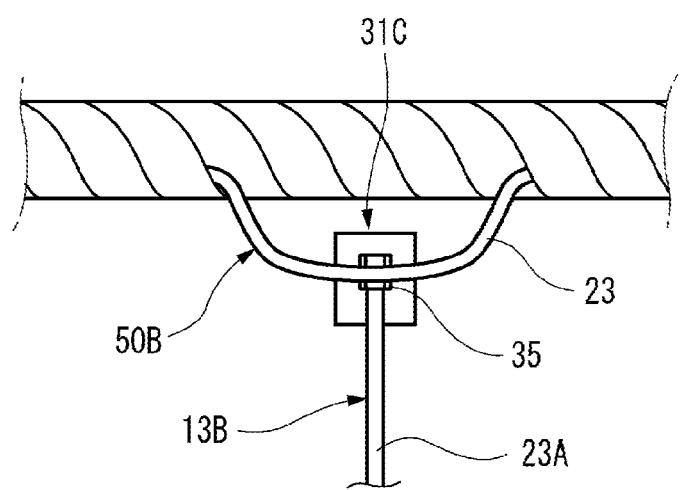
FIG. 6B is a plan view illustrating a state in which an additional connection member is connected to the branch connection portion.

As illustrated in FIG. 6B, when connecting the first end of the additional connection member 13B to the power supply wire 23 of the branch connection portion 50B in a branching manner, a worker can simply connect a pair of the press-contact blades 35 of a known harness branch connection mechanism 31C to the conductor of the power supply wire 23 in a press-contact manner.

Figure 7A:
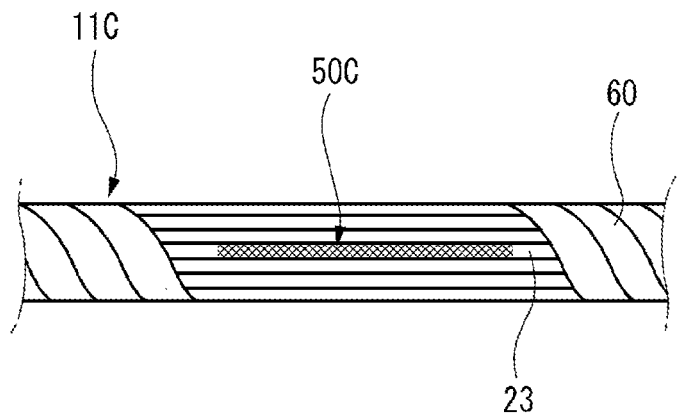
FIG. 7A is a plan view of a branch connection portion in the wire harness of a modification example of the first embodiment.

Since the color or shape of the insulating coating of the power supply wire 23 at a predetermined location in bundled electric wires of a main harness 11C is formed different from the color or shape of insulating coatings of other portions, the branch connection portion 50C illustrated in FIG. 7A can be visually identified at the predetermined location on the main harness 11C.

Figure 7B:
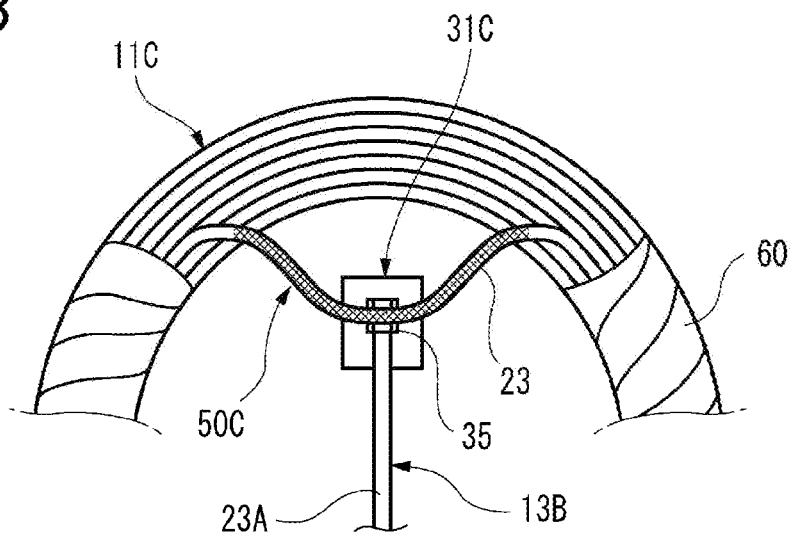
FIG. 7B is a plan view illustrating a sequence of connecting an additional connection member to the branch connection portion.

As illustrated in FIG. 7B, when connecting the first end of the additional connection member 13B to the power supply wire 23 of the branch connection portion 50C in a branching manner, a worker can simply connect the press-contact blades 35 of the known harness branch connection mechanism 31C to the conductor of the power supply wire 23 in a press-contact manner after bending the main harness 11C, and ensuring a space for a press-contact operation at the predetermined location on the power supply wire 23.

Figure 8A:
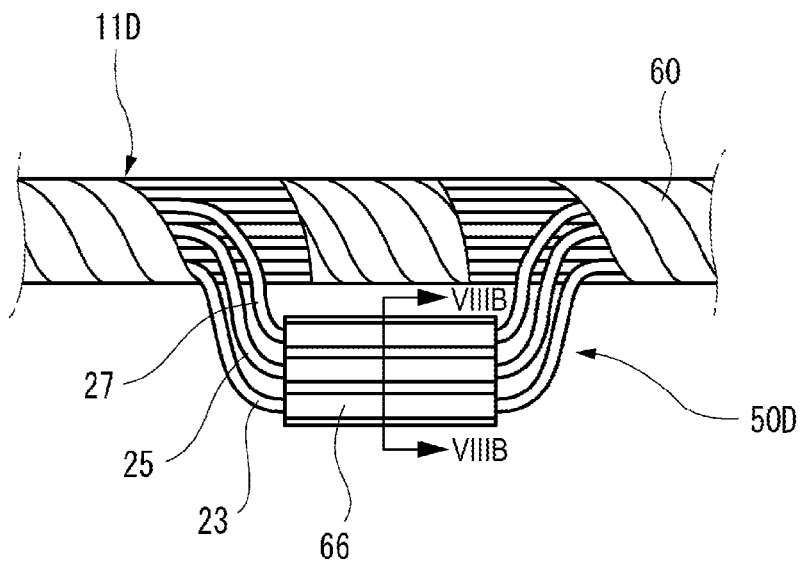
FIG. 8A is a plan view of a branch connection portion in the wire harness of a modification example of the first embodiment.

The branch connection portion 50D illustrated in FIG. 8A is configured such that three power supply wire 23, the communication wire 25, and the ground wire 27 are integrally held while being arrayed by a molded insulating coating 66 or the like.

Figure 8B:
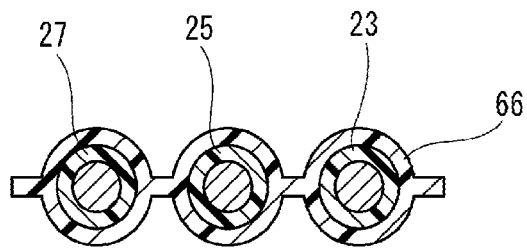
FIG. 8B is a sectional view taken along line VIIIB-VIIIB in FIG. 8A.

That is, the branch connection portion 50D of the modification example is provided in such a manner that the respective extra-length portions of the power supply wire 23, the communication wire 25, and the ground wire 27 stick out of a gap in the insulating tape 60 wrapped around bundled electric wires of the main harness 11D. Since the respective extra-length portions of the power supply wire 23, the communication wire 25, and the ground wire 27 are held by the insulating coating 66 shown in FIG. 8B in the shape of a flat cable while being arrayed in parallel with each other, the branch connection portion 50D can be visually identified at a predetermined location on the main harness 11D.

The branch connection portion 50D may be fixed with a tape or the like along an outer circumference of the main harness 11D.

Accordingly, when connecting the first end of the additional connection member 13A to the power supply wire 23, the communication wire 25, and the ground wire 27 of the branch connection portion 50D in a branching manner, a worker can respectively connect three press-contact blades of a harness branch connection mechanism for a flat cable (not illustrated) to the conductors of all the power supply wire 23, the communication wire 25, and the ground wire 27 in a press-contact manner at once.

That is, in a known harness branch connection mechanism for a flat cable, when the power supply wire 23, the communication wire 25, and the ground wire 27 are simultaneously interposed between the upper and lower cases while being arrayed in parallel with each other, the press-contact blades dissect the insulating coatings of the power supply wire 23, the communication wire 25, and the ground wire 27, and can be connected in a press-contact manner to all the conductors of the power supply wire 23, the communication wire 25, and the ground wire 27 at once, and thereby a press-contact operation can be easily performed.

Figure 9A:
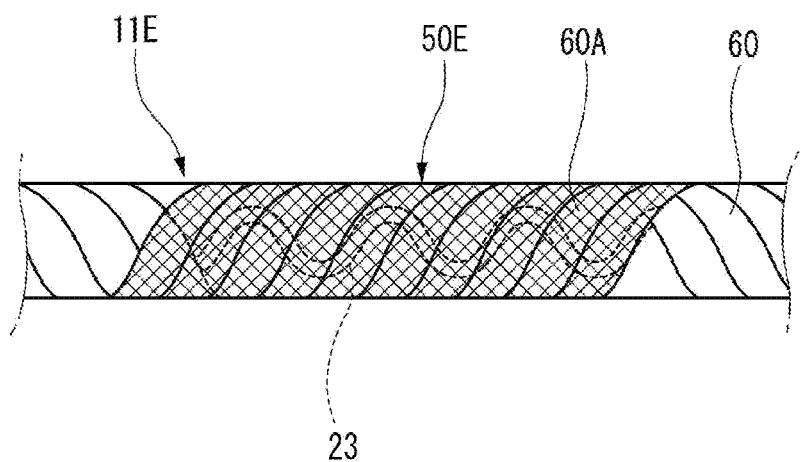
FIG. 9A is a plan view of a branch connection portion in the wire harness of a modification example of the first embodiment.

The branch connection portion 50E illustrated in FIG. 9A is provided in such a manner that the extra-length portion of the power supply wire 23 is wrapped and covered with an insulating tape 60A having a color or shape different from that of the insulating tape 60, the extra-length of the power supply wire 23 being exposed from the insulating tape 60 wrapped around bundled electric wires of a main harness 11E.

That is, the extra-length of the power supply wire 23 is covered with the insulating tape 60A wrapped around the bundled electric wires of the main harness 11E, and thus the branch connection portion 50E of the modification example can be visually identified at a predetermined location on the main harness 11E.

Figure 9B:
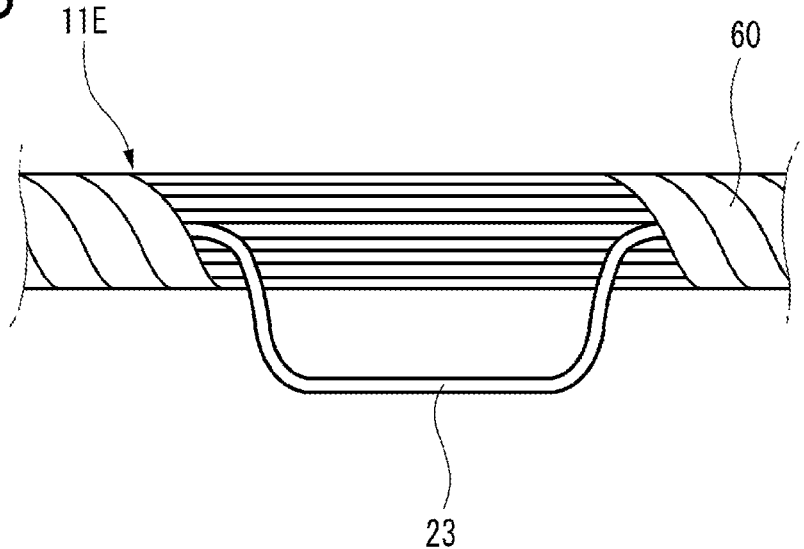
FIG. 9B is a plan view illustrating a state before an additional connection member is connected to the branch connection portion.

As illustrated in FIG. 9B, when connecting the first end of the additional connection member 13B to the power supply wire 23 of the branch connection portion 50E in a branching manner, a worker can simply connect the additional connection member 13B to the power supply wire 23 by peeling the insulating tape 60A from the extra-length portion of the power supply wire 23 such that the extra-length portion of the power supply wire 23 is exposed, and then connecting the press-contact blade 35 of the known harness branch connection mechanism 31C to the conductor of the power supply wire 23 in a press-contact manner.

Figure 10:
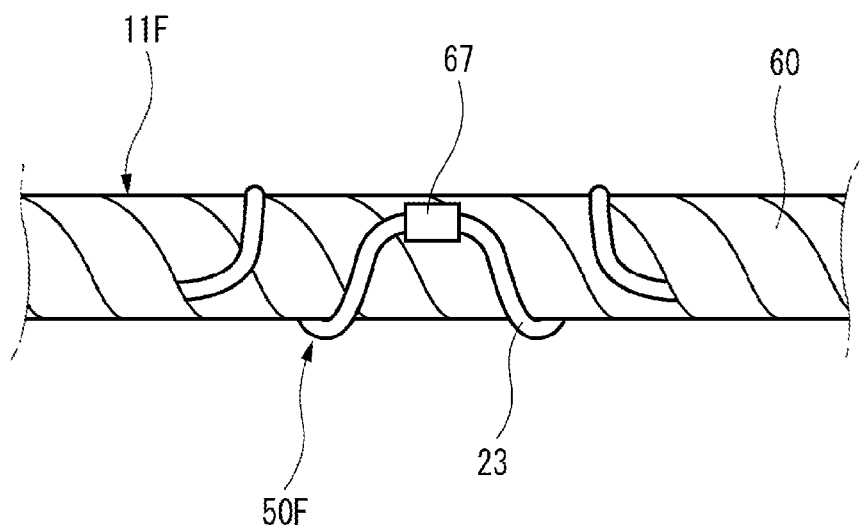
FIG. 10 is a plan view of a branch connection portion in the wire harness of the first embodiment.

The branch connection portion 50F illustrated in FIG. 10 is provided in such a manner that an extra-length portion of the power supply wire 23 is wrapped around an outer circumference of a main harness 11F, the extra-length portion of the power supply wire 23 sticking out of a gap in the insulating tape 60 wrapped around bundled electric wires of the main harness 11F.

That is, since the extra-length portion of the power supply wire 23 is fixed with a tape 67 mounted on the outer circumference of the main harness 11F, the extra-length portion of the power supply wire 23 sticking out of the gap in the insulating tape 60 wrapped around the bundled electric wires of the main harness 11F, the branch connection portion 50F of the modification example can be visually identified at a predetermined location on the main harness 11F.

The extra-length portion of the power supply wire 23 is wrapped around the outer circumference of the main harness 11F, and even if the extra-length portion of the power supply wire 23 is not connected in a branching manner to the first end of the additional connection member, the extra-length portion of the power supply wire 23 does not interfere with other components, and thus is prevented from being damaged.

When connecting the first end of the additional connection member 13B to the power supply wire 23 of the branch connection portion 50F in a branching manner, a worker can simply connect the first end of the additional connection member 13B to the power supply wire 23 by peeling the tape 67 from the outer circumference of the main harness 11F, unwrapping the extra-length portion wrapped around the outer circumference of the main harness 11F, and then connecting the press-contact blade 35 of the known harness branch connection mechanism 31C to the conductor of the power supply wire 23 in a press-contact manner. That is, it is possible to eliminate labor of pulling the power supply wire 23 of length required to perform a branch connection operation from the bundle of the main harness 11F.

Figure 11A:
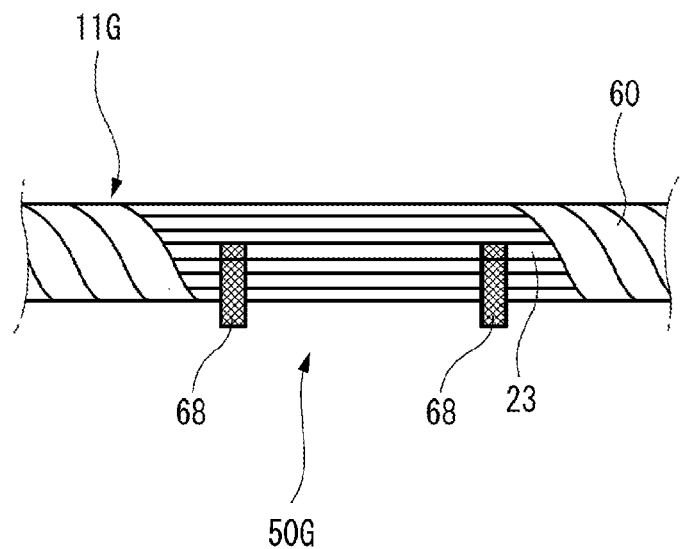
FIG. 11A is a plan view of a branch connection portion in the wire harness of a modification example of the first embodiment.

The branch connection portion 50G illustrated in FIG. 11A is configured such that a pair of tagged tapes 68 are wrapped around the power supply wire 23 while being positioned at predetermined locations on bundled electric wires of a main harness 11G with an appropriate gap therebetween, and thus can be visually identified at the predetermined locations on the main harness 11G.

Figure 11B:
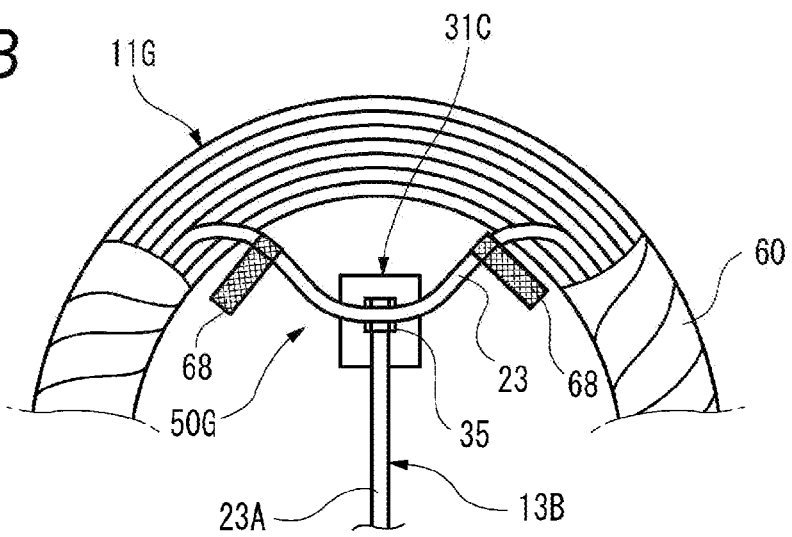
FIG. 11B is a plan view illustrating the sequence of connecting an additional connection member to the branch connection portion.

As illustrated in FIG. 11B, when connecting the first end of the additional connection member 13B to the power supply wire 23 of the branch connection portion 50G in a branching manner, a worker can simply connect the press-contact blade 35 of the known harness branch connection mechanism 31C to the conductor of the power supply wire 23 in a press-contact manner after bending the main harness 11G, and ensuring a space for a press-contact operation at the predetermined location on the power supply wire 23.

Subsequently, effects of the wire harness 1 having the aforementioned configuration are described.

In the wire harness 1 of the first embodiment, it is possible to commonly use the main harness 11 (11A to 11G) that can be commonly installed in a plurality of installation target vehicles, and it is possible to later connect the electrical device 29, to be installed in the installation target vehicle, to the main harness 11 via the additional connection member 13 (13A and 13B), the first end of which is connected to the power supply wire 23 and the communication wire 25 of the main harness 11 (11A to 11G). Accordingly, there are no waste or disused constituent components occurring in the main harness 11 (11A to 11G).

Since it is possible to connect the additional connection member 13 (13A and 13B) to the main harness 11 (11A to 11G) in a branching manner, depending on the number of electrical devices 29 to be installed on the installation target vehicle, there are no waste or disused constituent components occurring in the entire wire harness 1.

In the structure of a wire harness in the related art, an increase in the number of optional electrical devices to be installed causes the increase of the entire part numbers of wire harnesses along with the number of installation combinations of the optional electrical devices. In contrast, in the wire harness 1 of the first embodiment, it may be sufficient if a part number of only the additional connection member 13 (13A and 13B) is ensured corresponding to the number of optional electrical devices 29. Accordingly, it is easy to manage manufacturing components, and it is possible to reduce a wire harness manufacturing cost.

In addition, the branch connection portion 50 (50A to 50G), to which the first end of the additional connection member 13 (13A and 13B) is connected in a branching manner, is visually identifiably provided at the predetermined location on the main harness 11 (11A to 11G). For example, the branch connection portion 50 (50A to 50G) is provided such that, as in an extra-length portion, the shape of an electric wire is formed different from those of other portions, or the color or shape of an electric wire formed different from those of other portions. Accordingly, a worker can easily identify the branch connection portion 50 (50A to 50G) connected to the first end of the additional connection member 13 (13A and 13B), and the power supply wire 23 and the communication wire 25, which are the predetermined wires, when connecting the additional connection member 13 (13A and 13B) to the main harness 11 (11A to 11G) in a branching manner in the inspection/finishing step after the wiring step in the manufacturing process for the wire harness 1, or when connecting the first end of the additional connection member 13 (13A and 13B) to the main harness 11 (11A to 11G) in a branching manner so that the optional electrical device 29 can be later connected to a vehicle-mounted wire harness 1. For this reason, it is possible to prevent the first end of the additional connection member 13 (13A and 13B) from being erroneously later connected to an electric wire which is not predetermined electric wires of the main harness 11 (11A to 11G), and it is possible to prevent the occurrence of a case in which the additional connection member 13 (13A and 13B) cannot be appropriately connected to the electrical device 29 because the branch connection location is too far apart from the electrical device 29.

In the wire harness of the modification example of the first embodiment illustrated in FIGS. 5A and 5B, the branch connection portion 50A is configured such that the two power supply wire 23 and the communication wire 25 are held while being arrayed.

Accordingly, when connecting the first end of the additional connection member 13A to the branch connection portion 50A of the main harness 11A in a branching manner, a worker can connect the press-contact portion of the harness branch connection mechanism 31B to the respective conductors of both the power supply wire 23 and the communication wire 25 in a press-contact manner at once. As a result, the first end of the additional connection member 13A can be easily connected in a branching manner to the plurality of power supply wire 23 and communication wire 25, and connection between the main harness 11A and the electrical device 29 is simply completed.

In the wire harness of the modification example of the first embodiment illustrated in FIG. 10, the branch connection portion 50F is configured such that the extra-length portion of the power supply wire 23 is wrapped around the outer circumference of the main harness 11F.

When connecting the first end of the additional connection member 13B to the power supply wire 23 of the branch connection portion 50F of the main harness 11F in a branching manner, a worker can simply perform a branch connection operation only by unwrapping the extra-length portion of the power supply wire 23 wrapped around the outer circumference of the main harness 11F. That is, it is possible to eliminate labor of pulling the power supply wire 23 of length required to perform the branch connection operation from the bundle of the main harness 11F. The extra-length portion of the branch connection portion 50F is wrapped around the outer circumference of the main harness 11F, and even if the extra-length portion of the branch connection portion 50F is not connected in a branching manner to the first end of the additional connection member 13B, the extra-length portion of the branch connection portion 50F does not interfere with other components, and thus is prevented from being damaged.

Accordingly, the part number of the wire harness 1 of the first embodiment can be commonly used, and a waste or disuse of the wire harness 1 can be prevented.

Hereinafter, a second embodiment of the present invention is described with reference to the accompanying drawings.

Figure 12:
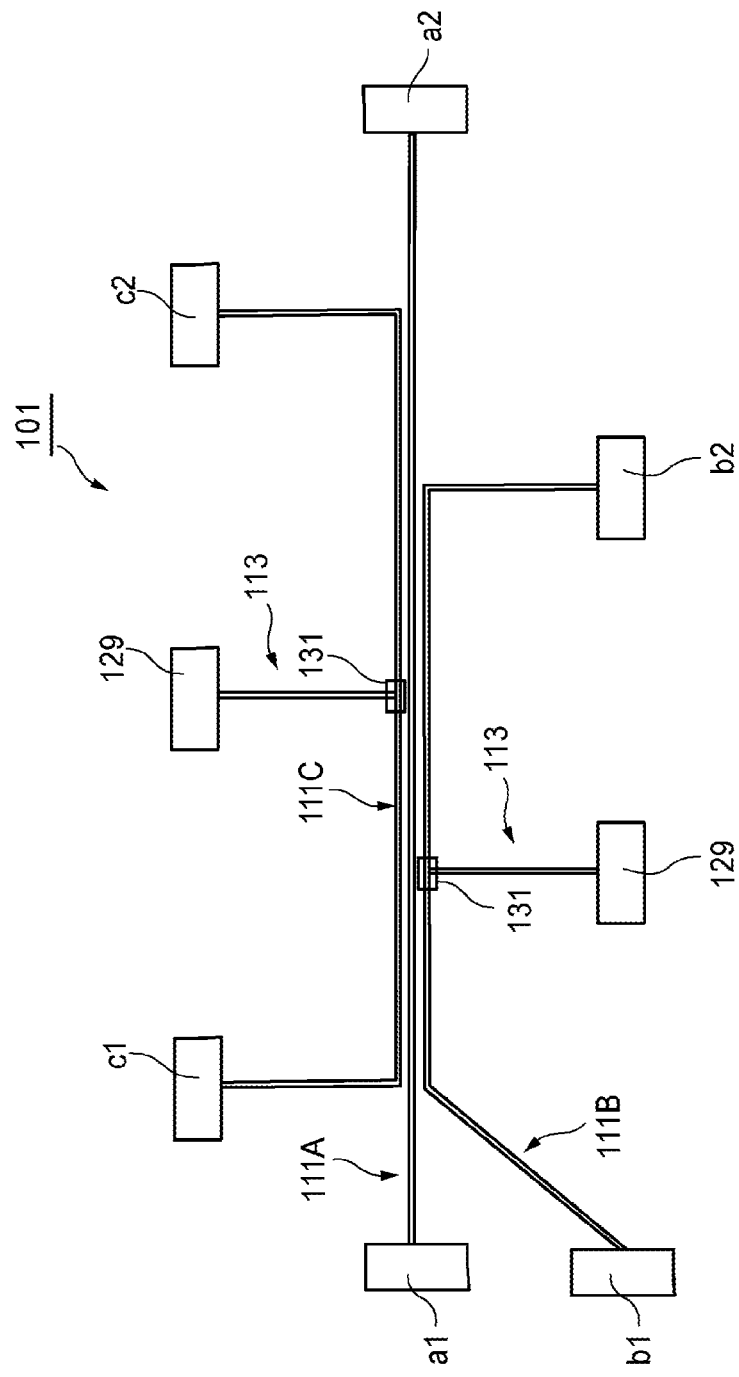
FIG. 12 is a schematic view of a wire harness manufactured by a wire harness manufacturing method of a second embodiment of the present invention.

FIG. 12 is a schematic view of a wire harness 101 manufactured by a wire harness manufacturing method according to the second embodiment of the present invention.

Figure 13:
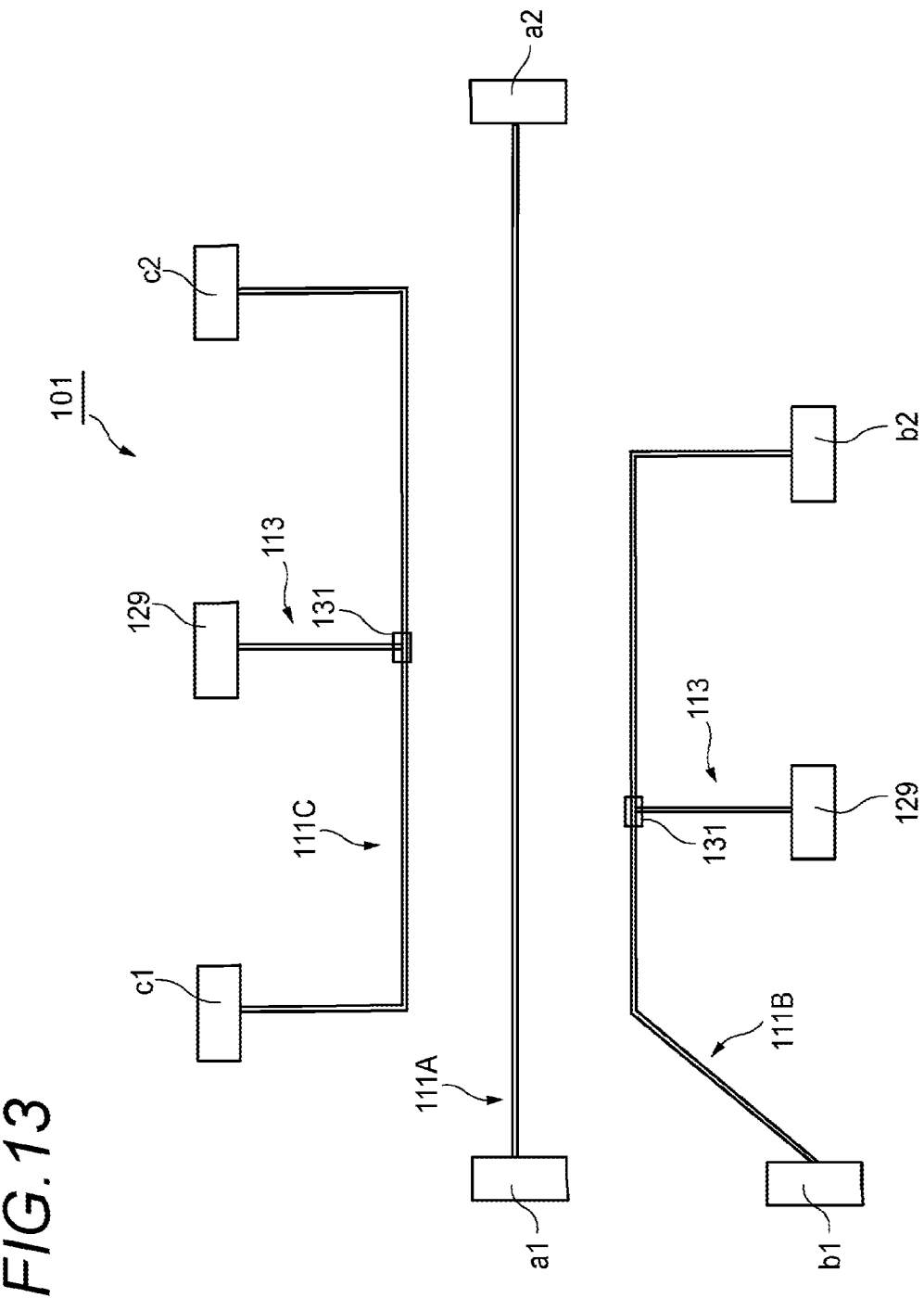
FIG. 13 is a schematic view illustrating a state in which sub harnesses are disassembled from the wire harness illustrated in FIG. 12.

As illustrated in FIGS. 12 and 13, the wire harness 101 of the second embodiment includes three sub harnesses 111A, 111B, and 111C. Root ends (left ends in FIG. 12 or FIG. 13) of the sub harnesses 111A, 111B, and 111C have the connectors a1, b1, and c1 connected to control units (not illustrated), respectively, and branch ends (right ends in FIG. 12 or FIG. 13) thereof have the device-side connectors a2, b2, and c2 connected to destined connectors of controlled devices (electrical devices), which are targets controlled by the control units, respectively.

Each of the sub harnesses 111A, 111B, and 111C of the second embodiment is a main harness that can be commonly installed in a plurality of installation target vehicles, and is a bundle of three types of basic electric wires including a power supply wire 123, a communication wire 125, and a ground (GND) wire 127 (refer to FIGS. 15A, 15B and 15D). In addition to the aforementioned three electric wires, another electric wire such as a signal wire (not illustrated) may be added to each of the sub harnesses 111A, 111B, and 111C. A multiplex signal is transmitted through a communication wire 125 of each of the sub harnesses 111A, 111B, and 111C. A single signal is transmitted through the signal wire of each of the sub harnesses 111A, 111B, and 111C.

As illustrated in FIGS. 12 and 13, a first end of each of a plurality of additional connection members 113 is later connected to at least one of the power supply wire 123, the communication wire 125, and the ground (GND) wire 127 of each of the sub harnesses 111B and 111C in a branching manner. In the illustrated example, two additional connection members 113 are respectively connected to the sub harnesses 111B and 111C in a branching manner. As such, the wire harness 101 of the second embodiment is configured such that the plurality of additional connection members 113 are respectively connected in a branching manner to the sub harnesses 111B and 111C at arbitrary positions. Each of the additional connection members 113 can connect the sub harnesses 111B and an electrical device 129, and the sub harness 111C and an electrical device 129.

A second end of the additional connection member 113 is connected to at least one electrical device 129 later-installed in an installation target vehicle. The electrical device 129 is later connected to each of the sub harnesses 111B and 111C via the additional connection member 113 using any later connection method of "press contact", "bonding", "welding", and the like, which can allow the electrical device 129 to be connected to the sub harness. In the example of the second embodiment, the additional connection member 113 is connected in a branching manner to the power supply wire 123, the communication wire 125, and the ground wire 127 of each of the sub harnesses 111B and 111C using a harness branch connection mechanism 131 (to be described later).

As illustrated in FIGS. 12 to 14, a method of manufacturing the wire harness 101 of the second embodiment includes a sub manufacturing step (refer to FIG. 14) for manufacturing three sub harnesses 111A, 111B, and 111C, each of which includes the communication wire 125, the power supply wire 123, and the ground wire 127; a branch connection step (refer to FIG. 13) for later connecting the first end of the additional connection member 113 (the second end of the additional connection member 113 being connected to the electrical device 129) to each of the sub harnesses 111B and 111C in a branching manner; and a harness assembly step (refer to FIG. 12) for combining together the three sub harnesses 111A, 111B, and 111C for integration.

First, in the sub manufacturing step, a plurality of electric wires including the communication wire 125, the power supply wire 123, and the ground wire 127 are wired along a predetermined wiring path on a wiring board, the connectors a1, a2, b1, b2, c1, c2, and the like are respectively connected to the electric wires, or the bundled electric wires are covered with an insulating tape or a corrugated tube, and thus the desired sub harnesses 111A, 111B, and 111C are manufactured (refer to FIGS. 13 and 14).

Subsequently, in the branch connection step, for example, the first end of the additional connection member 113 is later connected to the communication wire 125, the power supply wire 123, and the ground wire 127 of each of the sub harnesses 111B and 111C in a branching manner, and the second end of the additional connection member 113 is connected to the optional electrical device 129 (refer to FIG. 13).

In this case, according to the method of manufacturing the wire harness of the second embodiment, the first end of the additional connection member 113 is connected in a branching manner to each of the sub harnesses 111B and 111C at an arbitrary position using a harness branch connection mechanism 131.

As illustrated in FIGS. 15A and 15B, the harness branch connection mechanism 131 of the second embodiment has a press-contact portion 133 that is connected in a press-contact manner to the conductors of the sub harnesses 111B and 111C by being connected to a conductor of the additional connection member 113. The press-contact portion 133 is configured such that a plurality of press-contact blades 135 in pairs are erected, and the press-contact portion 133 is connected to a predetermined circuit board 137. The circuit board 137 is accommodated in an insulating resin casing made up of an upper case 139 and a lower case 141. The upper case 139 and the lower case 141 are openably and closably connected to each other via thin-wall hinges (not illustrated).

In the harness branch connection mechanism 131, the power supply wire 123, the communication wire 125, and the ground wire 127 of each of the sub harnesses 111B and 111C are interposed between the upper case 139 and the lower case 141, and thereby press-contact blades 135 dissect insulating coatings of the power supply wire 123, the communication wire 125, and the ground wire 127, respectively, and the press-contact portion 133 is connected in a press-contact manner to the respective conductors of the power supply wire 123, the communication wire 125, and the ground wire 127. When the upper case 139 and the lower case 141 are locked into each other while the power supply wire 123, the communication wire 125, and the ground wire 127 of each of the sub harnesses 111B and 111C are interposed therebetween, the harness branch connection mechanism 131 is fixed to the sub harnesses 111B and 111C at arbitrary positions.

That is, according to the method of manufacturing the wire harness of the second embodiment, connection between each of the sub harnesses 111B and 111C and the electrical device 129 is simply completed merely when the harness branch connection mechanisms 131 are respectively installed on the sub harnesses 111B and 111C at the arbitrary positions. When the ground wire of the electrical device 129 is body grounded, it is not necessary to connect the electrical device 129 to the ground wire 127 of each of the sub harnesses 111B and 111C in a branching manner via the additional connection member 113.

The first end of the additional connection member 113 of the second embodiment is provided with a harness branch connection mechanism 131 through which the additional connection member 113 is connected in a branching manner to the power supply wire 123, the communication wire 125, and the ground wire 127 of each of the sub harnesses 111B and 111C, and the second end of the additional connection member 113 is provided with a device connection mechanism 161 through which the additional connection member 113 is connected to the optional electrical device 129. More specifically, as illustrated in FIG. 16A, the additional connection member 113 has an electric wire 155; a sub harness-side connector 147 connected to the harness branch connection mechanism 131 at an end of the electric wire 155 adjacent to the sub harness; and a device-side connector 151 connected to the electrical device 129 at an end of the electric wire 155 adjacent to the electrical device. The additional connection member 113 is connected to the device connection mechanism 161 made up of the device-side connector 151 along with a connector 163 of the electrical device 129, and the sub harness-side connector 147 is connected to a board mounting connector 143 of the harness branch connection mechanism 131.

That is, the additional connection member 113 of the second embodiment can connect the electrical device 129 to each of the sub harnesses 111B and 111C via the electric wire 155 of desired length, and thus can be mounted in alignment with the position of the electrical device 129, and provide high versatility.

The form of an additional connection member of the present invention is not limited to that of the additional connection member 113 of the second embodiment, and various forms of an additional connection member can be adopted.

For example, an additional connection member 113A illustrated in FIG. 16B is configured such that the end of the electric wire 155 adjacent to the sub harness is directly connected to the press-contact portion 133 of the harness branch connection mechanism 131, and the device-side connector 151 is connected to the connector 163 of the electrical device 129.

An additional connection member 113B illustrated in FIG. 16C is configured such that the end of the electric wire 155 adjacent to the sub harness is directly connected to the press-contact portion 133 of the harness branch connection mechanism 131, and the end of the electric wire 155 adjacent to the electrical device is directly connected to a circuit of the electrical device 129, and is configured integrally with the electrical device 129. Naturally, the additional connection member 113B can also be configured such that the sub harness-side connector 147, provided at the end of the electric wire 155 adjacent to the sub harness, is connected to the board mounting connector 143 of the harness branch connection mechanism 131 (refer to FIG. 16A).

Figure 17:
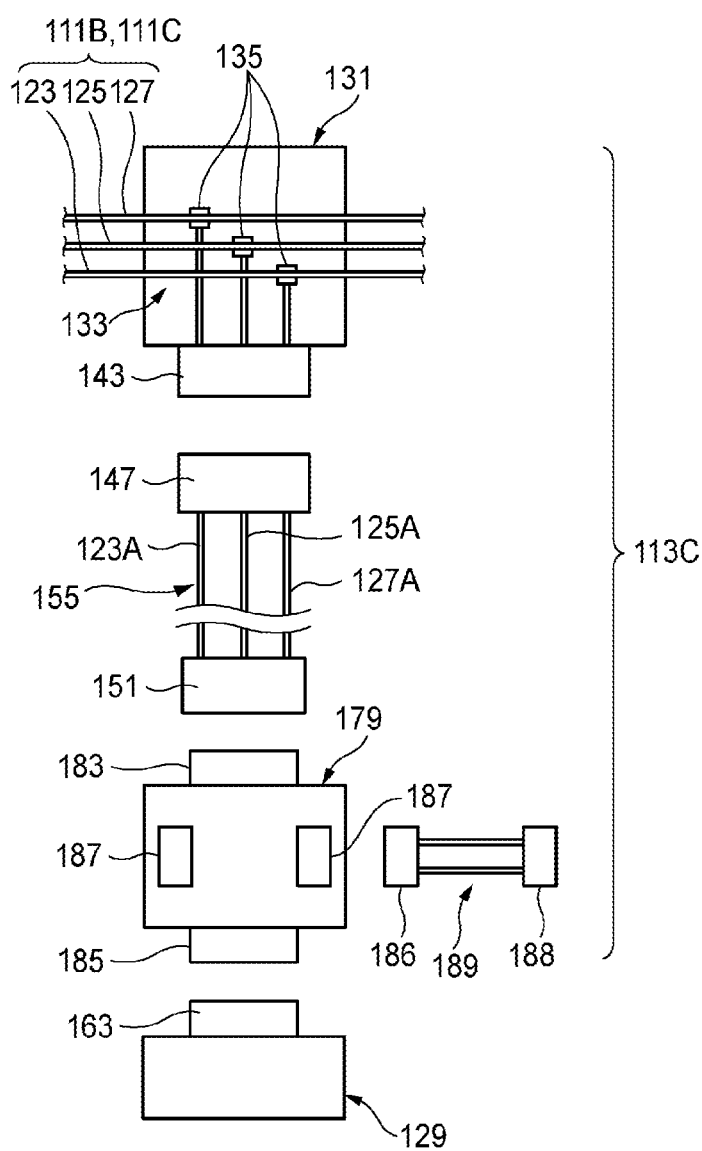
FIG. 17 is a plan view of a branch connection mechanism that has a branch connector configured to connect the electrical device to the branch connection mechanism therebetween.

An additional connection member 113C illustrated in FIG. 17 has a branch connector 179 configured to connect the electrical device 129 to the additional connection member 113C therebetween. In the additional connection member 113C, the branch connector 179 is joined to the device-side connector 151. The branch connector 179 is provided with a plurality of joint portions (four in the illustrated example). The device-side connector 151 of the electric wire 155 is joined to a first joint portion 183 of the branch connector 179. The connector 163 of the electrical device 129 is joined to a second joint portion 185 of the branch connector 179. A connector 186 of an additional harness 189 is joined to a third joint portion 187 of the branch connector 179. Accordingly, the branch connector 179 can be connected in a branching manner to another electrical device 129 via a connector 188 of the additional harness 189 in addition to being connected to the electrical device 129. Naturally, the electric wire 155 of the additional connection member 113C can also be configured such that the end of the electric wire 155 adjacent to the sub harness is directly connected to the press-contact portion 133 of the harness branch connection mechanism 131, and the end of the electric wire 155 adjacent to the electrical device is directly connected to a circuit of the branch connector 179.

The function of the electric wire 155 of the additional connection members 113, and 113A to 113C changes depending on the type (whether the electrical device 129 includes an electronic control unit, or the like) of the electrical device 129. For example, as illustrated in FIGS. 16A to 17, when the electrical device 129 including an electronic control unit (not illustrated) is provided in the vicinity of the end of the electric wire 155 adjacent to the electrical device, the electric wire 155 is made up of a power supply wire 123A, a communication wire 125A, and a ground wire 127A.

Naturally, it is possible to eliminate the branch connection step for the sub harness 111A which is not required to be connected to the optional electrical device 129.

In the final harness assembly step, the wire harness 101 is manufactured by combining together the separately manufactured sub harnesses 111A, 111B, and 111C for integration (refer to FIG. 12).

In addition, the wire harness 101 is assembled with a protective member such as a protector, a joint box, or the like, and as a result, the manufacturing of the wire harness 101 is completed.

Subsequently, effects of the method of the wire harness 101 having the aforementioned configuration are described.

According to the method of manufacturing the wire harness 101 of the second embodiment, it is possible to commonly use the sub harnesses 111A, 111B, and 111C of the wire harness 101 that can be commonly installed in a plurality of installation target vehicles, and it is possible to later connect the electrical devices 129, to be installed in an installation target vehicle, to the sub harnesses 111A, 111B, and 111C via the additional connection member 113 (113A to 113C), the first end of which is connected to the power supply wire 123, the communication wire 125, and the ground wire 127 of each of the sub harnesses 111B and 111C. Accordingly, there are no waste constituent components occurring in the sub harnesses 111A, 111B, and 111C.

Since it is possible to connect the additional connection member 113 to each of the sub harnesses 111A, 111B, and 111C in a branching manner depending on the number of electrical devices 129 to be installed on an installation target vehicle, there are no waste or disused constituent components occurring in the entire wire harness 101.

According to a wire harness manufacturing method in the related art, an increase in the number of optional electrical devices causes the increase of the entire part numbers of wire harnesses along with the number of installation combinations of the optional electrical devices. In contrast, in the wire harness 101 of the second embodiment, it may be sufficient if a part number of only the additional connection member 113 (113A to 113C) corresponding to the optional electrical device 129 is ensured. Accordingly, it is easy to manage manufacturing components, and it is possible to reduce a wire harness manufacturing cost.

According to the method of manufacturing the wire harness 101 of the second embodiment illustrated in FIGS. 15A to 15D, the additional connection member 113 is connected in a branching manner to a connection portion of each of the sub harnesses 111B and 111C via the harness branch connection mechanism 131 so that the electrical device 129 is connected to each of the sub harnesses 111B and 111C. When the harness branch connection mechanism 131 is installed on the sub harnesses 111B and 111C, the press-contact portion 133 dissects an insulating coating portion with which the respective conductors of the power supply wire 123, the communication wire 125, and the ground wire 127 of each of the sub harnesses 111B and 111C, and the press-contact portion 133 are coated, and the press-contact portion 133 is connected to the conductors. Connection between each of the sub harnesses 111B and 111C and the electrical device 129 is simply completed merely when the harness branch connection mechanism 131 is installed on the sub harnesses 111B and 111C.

Accordingly, according to the method of manufacturing the wire harness 101 of the second embodiment, the part number of the wire harness 101 can be commonly used, and a waste of the wire harness 101 can be prevented.

Hereinbelow, characteristics of the patterns of the wire harnesses of the present invention are briefly summarized.

[1] A wire harness (1) including a main harness (11 and 11A to 11G) that can be commonly installed in a plurality of installation target vehicles, and a branch connection portion (50 and 50A to 50G) that is visually identifiably provided at a predetermined location on at least any one of a communication wire (25), a power supply wire (23), a signal wire, and a ground wire (27) of the main harness (11 and 11A to 11G), in which an additional connection member (13, 13A, and 13B), connected to at least one electrical device (29) that is actually installed in one of the plurality of installation target vehicles, is later connectable to the branch connection portion (50 and 50A to 50G) in a branching manner.

[2] The wire harness (1) with the configuration [1], in which at least two of the communication wire (25), the power supply wire (23), the signal wire, and the ground wire (27) are held in the branch connection portion (50A and 50D) while being arrayed.

[3] The wire harness (1) with the configuration [1] or [2], in which the branch connection portion (50F) is configured as an extra-length portion wrapped around an outer circumference of the main harness (11F).

[4] A method of manufacturing a wire harness (101), the method including: a sub manufacturing step for manufacturing a plurality of sub harnesses (111A, 111B, and 111C), each of which includes at least any one of a communication wire (125), a power supply wire (123), a signal wire, and a ground wire (127); a branch connection step for later connecting a first end of an additional connection member (113) to at least one of the sub harnesses (111B and 111C) in a branching manner, a second end of the additional connection member (113) being connected to an electrical device (129); and a harness assembly step for combining the plurality of sub harnesses (111A, 111B, and 111C) for integration.

[5] The method of manufacturing the wire harness (101) with the configuration [4], in which in the branch connection step, the first end of the additional connection member (113) is later connected in a branching manner to the sub harness (111B and 111C) using a harness branch connection mechanism (131) configured to be connected in a press-contact manner to a conductor of at least any one of the communication wire (125), the power supply wire (123), the signal wire, and the ground wire (127).

The present invention is not limited to the embodiments, and modifications, improvements, and the like can be appropriately made to the embodiments. In addition, the material, shape, and dimension of each constituent element, the number of constituent elements, the disposition location, and the like in the embodiments are arbitrary and are not limited insofar the present invention can be achieved.

For example, in the main harness 11 of the embodiments, the insulating tape 60 is wrapped around the outer circumference of bundled wires so that a plurality of the electric wires are bound; however, an electric wire protective member such as a protector or a corrugated tube can be used to accommodate a plurality of electric wires.

What is claimed is:

1. A wire harness comprising:
a main harness that can be commonly installed in a plurality of installation target vehicles; and
a branch connection portion that is visually distinct from the main harness provided at a predetermined location on at least one wire of a plurality of wires of the main harness, the branch connection portion including a continuous extra-length wire portion of the at least one wire, electrically connecting a first side of the at least one wire to a second side of the at least one wire;
wherein an additional connection member, connected to at least one electrical device that is installed in one of the plurality of installation target vehicles, is connectable to the continuous extra-length wire portion of the branch connection portion in a branching manner.

2. The wire harness according to claim 1, wherein at least two wires of the plurality of wires are held in the branch connection portion while being arrayed.

3. The wire harness according to claim 1, wherein the branch connection portion is configured as an extra-length portion wrapped around an outer circumference of the main harness.

4. The wire harness according to claim 1, wherein the additional connection member is connectable to the branch connection branch connection portion in an electrically parallel manner.

5. The wire harness according to claim 1, wherein branch connection portion is visually distinct from the main harness via a color of the branch connection portion.

6. The wire harness according to claim 1, wherein the plurality of wires comprise a communication wire through which a multiplex signal passes, a signal wire through which a single signal passes, a power supply wire for supply power and a ground wire.

7. The wire harness according to claim 1, further comprising:
a first protective member that accommodates the main harness, wherein the continuous extra-length wire portion is exposed from the first protective member.

8. The wire harness according to claim 7, wherein the first protective member is an insulating tape wrapped around a bundle of the plurality of wires of the main harness.

9. The wire harness according to claim 7, further comprising:
a second protective member that accommodates the plurality of wires at the branch connection portion, wherein the second protective member is different from the first protective member to be visually distinct from the main harness.

* * * * *